OSCILLATOR APPARATUS FOR GENERATING TONE FREQUENCIES

Filed Dec. 23, 1966

INVENTOR
PAUL ABRAMSON

BY John J. Goodwin

ATTORNEY

United States Patent Office 3,427,569

Patented Feb. 11, 1969

3,427,569

OSCILLATOR APPARATUS FOR GENERATING TONE FREQUENCIES

Paul Abramson, Yorktown Heights, N.Y., assignor to International Business Machines Corporation, Armonk, N.Y., a corporation of New York

Filed Dec. 23, 1966, Ser. No. 604,244

U.S. Cl. 331—117 4 Claims

Int. Cl. H03b *5/00;* G10h *5/00*

ABSTRACT OF THE DISCLOSURE

This disclosure describes a device including an oscillator selected from a given class. The inductance coil of the oscillator includes a plurality of taps to each of which a uni-directional switch is connected. The coil is open-ended and when a switch is closed, the associated tap is connected to an electrical potential level such as a positive voltage source or ground. By connecting a given tap to such potential level the oscillator operates at an associated frequency. If a different switch had been closed, the potential level would be connected to a different tap and the oscillator would operate at a different frequency. The various possible operating frequencies are referred to as tones and are representative of the associated switches, which may in turn be associated with intelligence, for example, by being part of an alpha-numeric keyboard.

The present invention relates to devices for producing coded tones and more particularly to devices which may be selectively switched to produce one of a plurality of acoustical tones representative of coded information.

An object of the present invention is to provide an improved tone generating device.

Another object of the present invention is to provide a tone generating device including an oscillator which is controlled by single pole switches.

Still another object of the present invention is to provide a tone generating device wherein the tones may be selected by a control device located at a relatively remote location.

A still further object of the present invention is to provide a tone generating device including an oscillator having a plurality of taps and a substantially constant Q.

The foregoing and other objects, features and advantages of the invention will be apparent from the following more particular description of preferred embodiments of the invention, as illustrated in the accompanying drawings.

Figure 1:
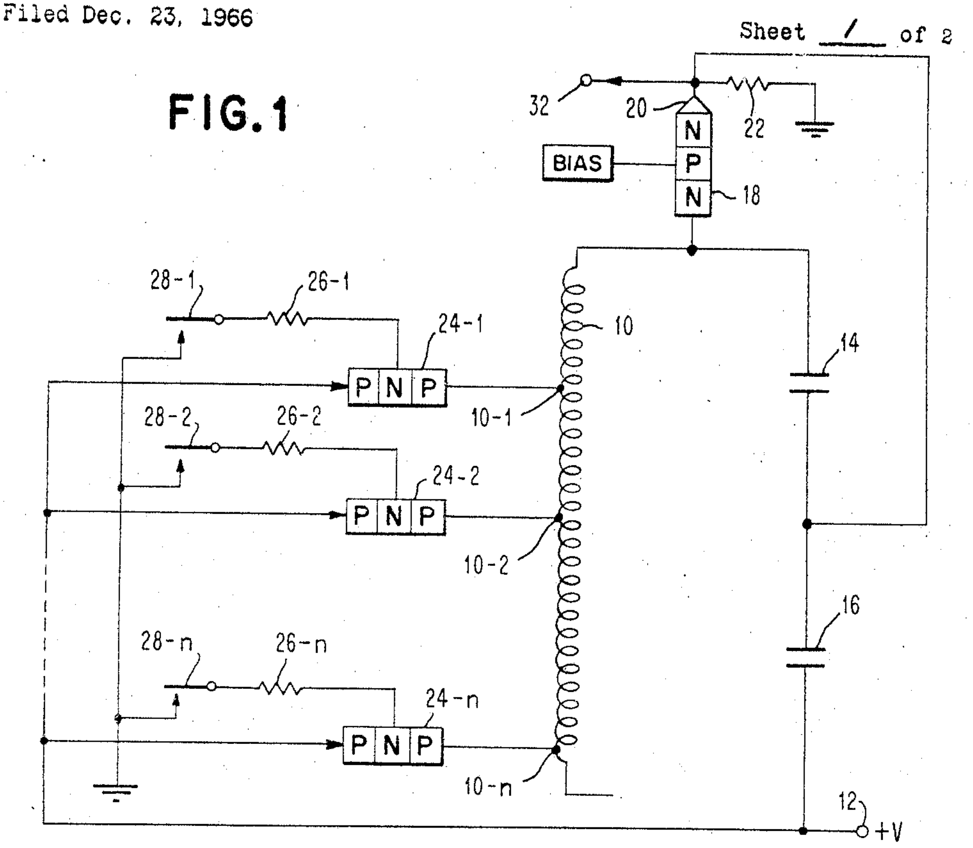
FIG. 1 is a schematic diagram of one embodiment of a tone generating device according to the principles of the present invention.

Referring to FIG. 1, a tone generating device is shown including an oscillator of the type having an inductance coil 10 which is normally connected to a voltage level such as positive potential source 12. In the device however the inductance coil 10 is disconnected from potential source

12 and is permitted to hang free. The oscillator further includes capacitors 14 and 16, NPN transistor 18 having an emitter 20 connected through resistor 22 to ground. The inductance coil 10 contains a plurality of taps 10–1, 10–2 through **10–*n*. Each of the inductance coil taps 10–1 through 10–*n* have connected thereto the collector of associated PNP transistors 24–1 through 24–*n*. Each of the transistors 24–1 through 24–*n* have their bases selectively connected to ground potential through resistors 26–1 through 26–*n* and switches 28–1 through 28–*n* respectively. The emitters of each of the transistors 24–1 through 24–*n* are connected to positive potential source 12**.

The switches 28–1 through **28–*n* are normally open and each of the associated transistors 24–1 through 24–*n* are normally cut-off and nonconducting. When all the switches 28–1 through 28–*n* are open, the oscillator portion of the device is not oscillating and there is not output at terminal 32. When any one of the switches 28–1 through 28–*n* is closed, the associated one of transistors 24–1 through 24–*n* conducts to saturation and positive potential from source 12 is connected to the associated one of taps 10–1 through 10–*n*. The forward resistance of the saturated transistor is low. By this connecting a given one of the taps 10–1 through 10–*n* to positive potential the oscillator circuit of the device is completed and the oscillator turns on and will produce an output signal at terminal 32 having a frequency or tone determined by the particular tap which is connected to the positive potential because the location of the tap on the inductance coil 10 determines the amount of inductance (L) which is included in the circuit. It is to be noted that when a given one of taps 10–1 through 10–*n* is connected to potential, the amount of inductance coil 10 between such tap and transistor 18** is included in the circuit, and the remainder of the inductance coil hangs free. Thus no portion of the coil is shorted out and consequently the Q of the oscillator circuit remains substantially constant with a resultant stability insured in the oscillator circuit.

Figure 2:
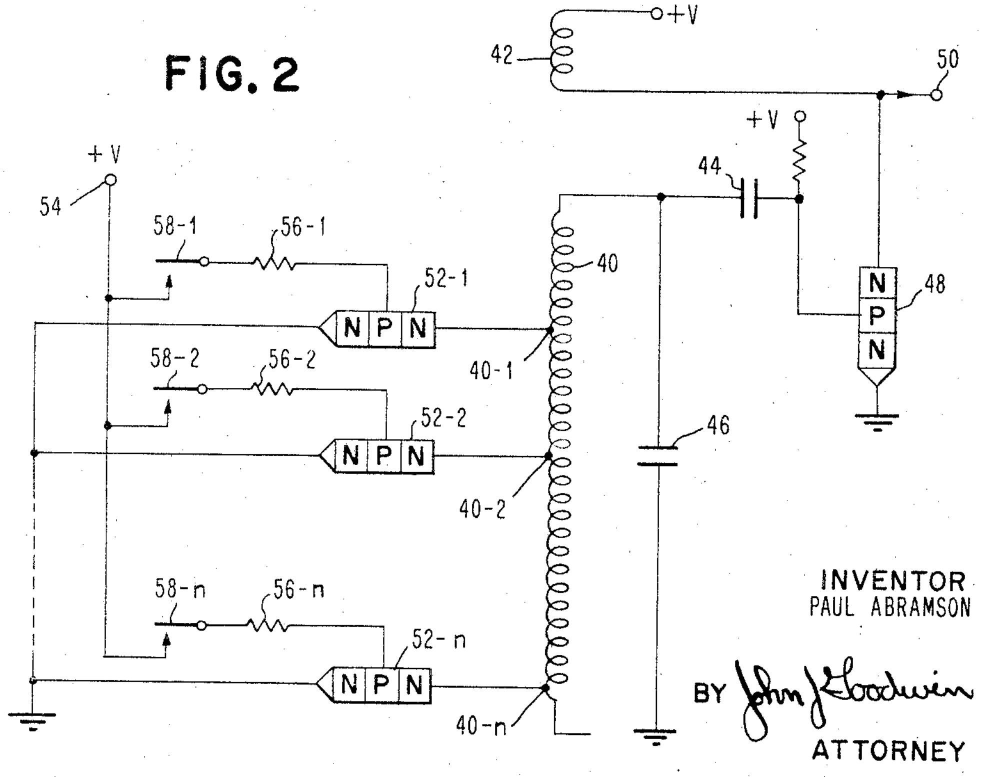
FIG. 2 is a schematic diagram of another embodiment of the present invention employing a different oscillator configuration.

Referring to FIG. 2, another embodiment of the present invention is shown including a different type of oscillator but still included in the defined class wherein one end of the inductance coil is connected to a ground or potential source. In FIG. 2 the oscillator is of the inductively coupled feedback type including an inductance coil 40 which includes feedback windings 42. The oscillator portion also includes capacitors 44 and 46, NPN transistor 48 and output terminal 50. The inductance coil 40 includes a plurality of taps 40–1 through **40–*n* to which are respectively connected NPN transistors 52–1 through 52–*n*. Transistors 52–1 through 52–*n* may have their bases connected to a positive potential source 54 via resistors 56–1 through 56–*n* and switches 58–1 through 58–*n* respectively. The emitters of each of the transistors 52–1 through 52–*n*** are connected to ground potential.

As in FIG. 1, the switches 58–1 through **58–*n* in FIG. 2 are normally open and each of the associated transistors 52–1 through 52–*n* are cut-off and the oscillator portion of the circuit does not oscillate and there is no output signal at terminal 50. When any one of the switches 58–1 through 58–*n* is closed, the associated one of transistors 52–1 through 52–*n* conducts to saturation thereby connecting ground potential to the associated one of taps 40–1 through 40–*n*. The forward resistance of the saturated transistor is low. By connecting a given one of taps 40–1 through 40–*n* to ground potential the oscillator circuit of the device is completed and the oscillator turns on and will produce an output signal at terminal 50 having a frequency or tone determined by the particular tap which is connected to ground potential because the location of the tap on the coil 40 will determine the amount of inductance (L) which is included in the circuit. As in FIG. 1, the remaining portion of the coil 40 in FIG. 2 not included in the oscillator circuit hangs free and is not shorted out. This permits the Q of coil 40** to remain substantially constant and the oscillator exhibits stability.

Both in FIGS. 1 and 2 the inductance coils may include a plurality of described taps and associated switching circuits. Each of the switching circuits connects a selected tap to positive potential (FIG. 1) or ground potential (FIG. 2) so that each of the devices of FIGS. 1 and 2 may be operated to produce selected ones of a plurality of different frequencies or tones at their output terminals 32 or 50. Such tone generating devices may be employed for many different uses, one of which will now be described.

Figure 3:
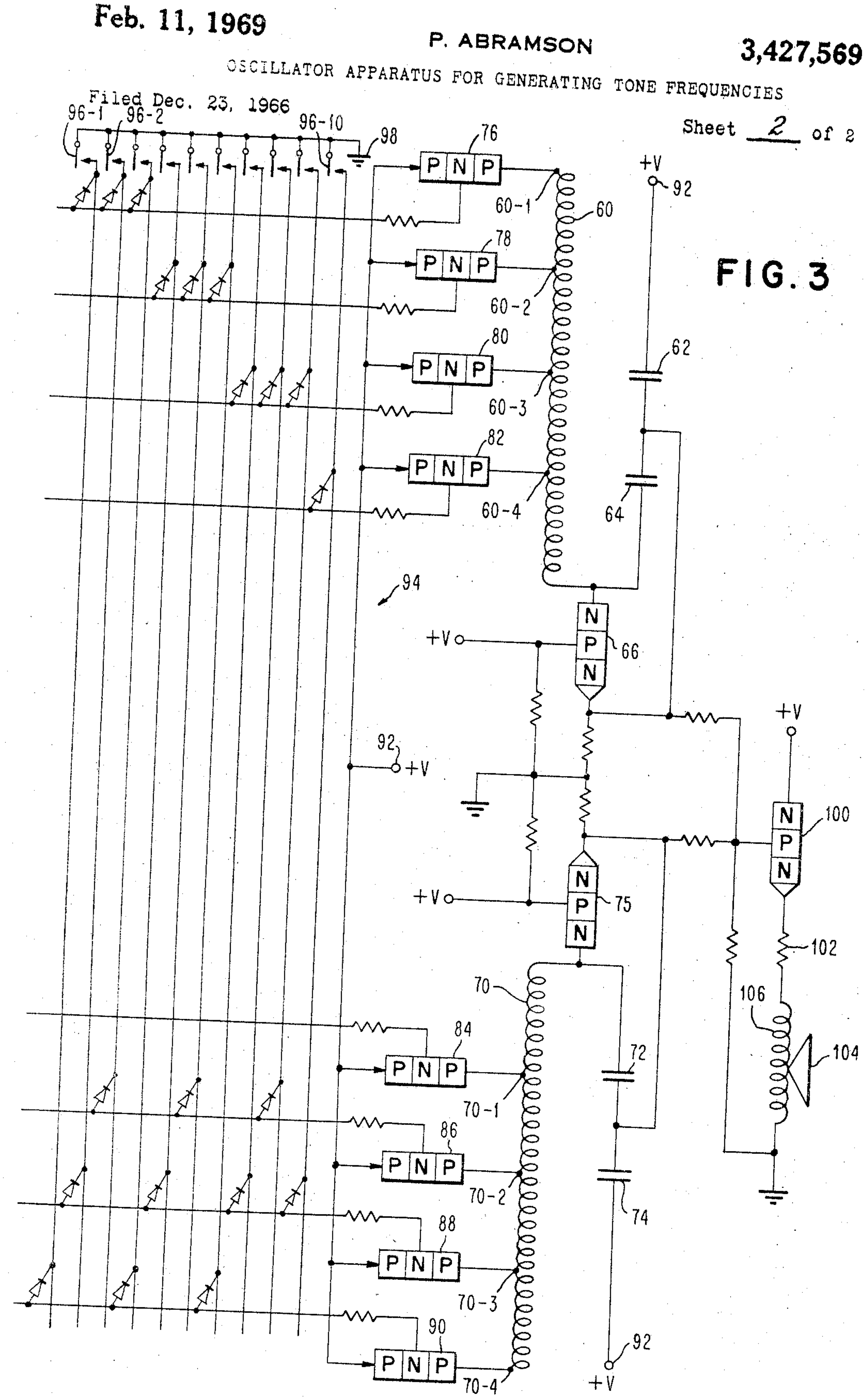
FIG. 3 is a schematic diagram of a complete system for tone generation including two tone generating devices of the present invention.

Referring to FIG. 3 a schematic diagram is shown of a circuit employing tone generating devices according to the present invention. In FIG. 3 two tone generating devices identical to the device of FIG. 1 are employed. The first device includes inductance coil 60 with taps 60–1, 60–2, 60–3 and 60–4, capacitors 62 and 64 and NPN transistor 66. The other device includes inductance coil 70 with taps 70–1, 70–2, 70–3 and 70–4, capacitors 72 and 74 and NPN transistor 76. The taps 60–1 through 60–4 and 70–1 through 70–4 are connected respectively to the collectors of PNP transistors 76, 78, 80, 82, 84, 86, 88 and 90. The emitters of transistors 76, 78, 80, 82, 84, 86, 88 and 90 are connected to a source of positive potential 92. The bases of transistors 76 through 90 are connected through a logic device such as diode matrix 94, through a bank of switches 96–1 through 96–10 to ground potential source 98.

Transistors 66 and 75 are connected through resistors to the base of an emitter follower transistor 100. The emitter of the emitter follower is connected through a current limiting resistor 102 to an acoustic transducer 104 via a coupling transformer 106.

When switch 96–1 is closed, the diode matrix connections serve to gate on transistors 76 and 90, causing taps 60–1 and 70–4 to be connected to positive potential source 92 and, in turn, the oscillator circuit including transistor 66 oscillates at a first frequency and the oscillator circuit including transistor 75 oscillates at a second frequency. The signals from transistors 66 and 75 are linearly mixed and applied to the base of emitter follower transistor 100. The combined frequency signal is thus connected to the acoustic coupler 104. The acoustic coupler 104 is a device which connects to the microphone portion of a telephone set so the output frequency of the system can be applied to and be transmitted on a telephone line.

In like manner, when switch 96–2 is closed (all other switches being open) the diode matrix connections cause transistors 76 and 88 to be gated on and taps 60–1 and 70–3 to be connected to positive potential 92 with the result that a different resultant mixed frequency is applied to the acoustic coupler 104. It is obvious to one skilled in the art that the closure of each of the other switches 96–3 through 96–10 will result in different combinations if the taps on coils 60 and 70 are connected to positive potential and a separate unique mixed frequency is produced for each switch closure.

The closure of the switches 96–1 through 96–10 may be effected by any number of different devices. For example, in a coding system the switches may be operated by an alpha-numeric keyboard, or in an identification system the switches may be operated by the insertion of a coded badge or credit card. The switching function may also be performed by a general purpose computer providing logical signals. Similarly a class of commutator devices may be used for switch closure. As stated before, the switches 96–1 through 96–10 may be located at a remote distance with respect to the matrix and oscillator circuits without suffering any undesired electrical distortions. It was described how the resultant tones produced by the system are applied to a telephone line. At the other end of the telephone line a connection may be made to a computer to serve as an input function.

It is to be understood that the device of FIG. 2 could have been employed in the embodiment of FIG. 3 so that the potential source 92 could be ground potential and the transistor gating signal 48 could be positive voltage.

What has been described is a tone generating device employing a class of L–C oscillators to provide selected output frequencies or tones. The frequency or tone oscillation may be selected from a relatively remote point without effecting the desired frequency since no frequency determining element is brought to the remote point. A single pole switch is all that is required to control two or more oscillator circuits simultaneously using a diode matrix. The use of switching transistors insure that the Q of the tapped inductance coils of the oscillators is unaffected thus providing stability.

While the invention has been particularly shown and described with reference to preferred embodiments thereof, it will be understood by those skilled in the art that various changes in form and details may be made therein without departing from the spirit and scope of the invention.

What is claimed is:

1. A frequency generating system comprising a first oscillating means including a first capacitive means, a first inductance coil and a source of potential connected to said capacitive means, a second oscillating means including a second capacitive means, a second inductance coil and a source of potential connected to said capacitive means, a plurality of taps connected to said first inductance coil and a plurality of taps connected to said second inductance coil, a first plurality of switching transistors, each separate one of said first plurality of transistors connected to a separate one of said plurality of taps on said first inductance coil, a second plurality of switching transistors, each separate one of said second plurality of transistors connected between a separate one of said plurality of taps on said second inductance coil and said source of potential, means for selectively providing input signals, means connected to said input signal means and to each of said first and second plurality of switching transistors, for connecting said input signals to a separate unique pair of switching transistors, one of said pair of switching transistors being of said first plurality of switching transistors and the other of said pair of switching transistors being of said second plurality of switching transistors, said input signal applied to said pairs of switching transistors to switch said transistors on to connect said source of potential to said associated taps connected to said pair of switching transistors to cause said first oscillating means to oscillate at a first frequency and said second oscillating means to oscillate at a second frequency.

2. A frequency generating system according to claim 1 further including means connected to said first and second oscillating means to combine said first and second frequency signals into a single mixed signal, and acoustical means connected to said last said means for converting said single mixed signal into an acoustical tone.

3. A frequency generating system according to claim 1 wherein said source of potential is positive voltage and said source of gating signal is ground potential.

4. A frequency generating system according to claim 1 wherein said means for selectively providing input signals includes a plurality of single pole switches, and wherein said means connected to said signals is a diode matrix connected between said single pole switches and said plurality of switching transistors.

References Cited

UNITED STATES PATENTS

| | | | |
|---|---|---|---|
| 3,101,447 | 8/1963 | Smith | 331—117 |
| 2,532,455 | 12/1950 | MacSorley | 331—179 |

| | | | |
|---|---|---|---|
| 2,761,066 | 8/1956 | Robinson | 334—56 |
| 2,801,341 | 7/1957 | Jaffe et al. | 331—181 |
| 2,930,991 | 3/1960 | Edwards | 331—117 |
| 2,991,357 | 7/1961 | True | 331—117 |
| 3,184,554 | 5/1965 | Meacham et al. | 331—117 |

JOHN KOMINSKI, *Primary Examiner.*

U.S. Cl. X.R.

84—1.05, 1.01; 331—179, 181; 334—56; 340—384